United States Patent [19]
Pierson, Jr.

[11] Patent Number: 5,911,194
[45] Date of Patent: Jun. 15, 1999

[54] APPARATUS FOR MECHANICALLY SEPARATING ANIMAL WASTE FROM LITTER

[75] Inventor: Harry G. Pierson, Jr., 38 Buckskin Path, Plymouth, Mass. 02360

[73] Assignee: Harry G. Pierson, Jr., Plymouth, Mass.

[21] Appl. No.: 08/873,676

[22] Filed: Jun. 12, 1997

[51] Int. Cl.⁶ .................................................. A01K 1/035
[52] U.S. Cl. ............................................................. 119/166
[58] Field of Search ........................... 119/166; 209/235, 209/260, 283, 288, 417, 418, 419, 420

[56] References Cited

U.S. PATENT DOCUMENTS

| | | |
|---|---|---|
| 63,170 | 3/1867 | Meyer . |
| 369,223 | 8/1887 | Bartlett et al. . |
| 436,351 | 9/1890 | Gove . |
| 436,352 | 9/1890 | Gove . |
| 824,421 | 6/1906 | Galloway . |
| 1,268,450 | 6/1918 | Gauntt . |
| 2,496,077 | 1/1950 | Wehner ................................ 209/260 |
| 3,908,597 | 9/1975 | Taylor .................................. 119/166 |
| 4,096,827 | 6/1978 | Cotter .................................. 119/166 |
| 4,120,261 | 10/1978 | Carter ................................. 119/166 |
| 4,190,525 | 2/1980 | Menzel ................................ 209/235 |
| 4,327,667 | 5/1982 | Bilak ................................... 119/166 |
| 4,574,735 | 3/1986 | Hohenstein ......................... 119/166 |
| 4,846,104 | 7/1989 | Pierson, Jr. ......................... 119/166 |
| 4,854,267 | 8/1989 | Morrow .............................. 119/166 |
| 5,048,454 | 9/1991 | Shirley ................................ 119/166 |
| 5,107,797 | 4/1992 | LaRoche ............................. 199/166 |
| 5,168,834 | 12/1992 | Buschur ............................. 119/166 |
| 5,178,099 | 1/1993 | Lapps et al. ........................ 119/166 |
| 5,272,999 | 12/1993 | Nussle ................................ 119/166 |
| 5,507,252 | 4/1996 | Ebert .................................. 119/166 |
| 5,509,379 | 4/1996 | Hoeschen .......................... 119/166 |
| 5,551,376 | 9/1996 | Lundeen et al. ................... 119/167 |
| 5,579,721 | 12/1996 | O'Toole ............................. 119/166 |
| 5,601,052 | 2/1997 | Rood et al. ........................ 119/166 |

FOREIGN PATENT DOCUMENTS 0 297 015  6/1988  European Pat. Off. .

OTHER PUBLICATIONS

Weiss, *The Washington Post*, Jun. 9, 1996, "The Doo Drop In".
*Pet Products News*, Jan. 1997, advertisement, Self–Cleaning Litter Box & Paw Cleaning Litter Mat.
Advertisement, LitterQuick.
Advertisement, A&M Products Inc., A First Bands Company, Kitty Kat Klean–up.
*Pet Products News* Jan. 1997, Advertisement, The EverClean Self–Scooping Litter Box.
Advertisement, Lift 'n Sift Litter Box, Zero Max Litter Box, PETMATE Starter Kit, BoodaLoo Litter Box, Nature's Miracle Litter Treatment, More Litter Products, p. 29.

*Primary Examiner*—Michael J. Carone
*Assistant Examiner*—Elizabeth Shaw
*Attorney, Agent, or Firm*—Fish & Richardson P.C.

[57] ABSTRACT

An apparatus, capable of functioning as a toilet for pets, and especially for cats. The apparatus mechanically separates animal solid waste and urine saturated litter clump waste from reusable litter during a complete revolution of the apparatus housing. Through rotation of the housing, a sifting member separates solid waste and litter clump waste from litter, the litter is aerated, and the sifting member becomes inclined in order to permit the separated waste to be propelled by gravity into a flexible waste receptacle.

22 Claims, 11 Drawing Sheets

APPARATUS FOR MECHANICALLY SEPARATING ANIMAL WASTE FROM LITTER

BACKGROUND OF THE INVENTION

The invention relates to an apparatus for separating animal solid waste and litter clump waste from clean litter.

The litter box is well-known as the toilet for indoor-dwelling animals—cats, in particular. Problems with the conventional litter box include unpleasant odors that emanate from an open reservoir of mingled waste and litter, as well as the untidy operation of extricating offensive waste from otherwise reusable litter. Numerous individuals have endeavored to improve the conventional litter box by introducing various types of machinery to remove waste portions from litter.

SUMMARY OF THE INVENTION

The invention features an apparatus that mechanically separates animal solid waste and urine-saturated litter clump waste from litter and deposits the waste into a flexible waste receptacle. The apparatus is maintained in an initial resting orientation for use as a toilet by an animal. The mechanical separation of waste is achieved by rotating the apparatus housing, thus allowing litter to pass through openings in a first portion of a sifting member that intersects and is attached to the inside of the housing. This aerates the litter and fosters the drying of moist litter that passes through the openings in the first portion of the sifting member. Animal solid waste and litter clump waste do not pass through and are retained by the first portion of the sifting member. As rotation of the housing continues, the sifting member becomes inclined and the retained waste is propelled by gravity down the sifting member and into the opening of a flexible waste receptacle, such as a plastic bag. During further rotation of the housing toward its initial resting orientation, the sifted litter is suspended in a litter storage space bounded, in part, by a second portion of the sifting member and a section of the interior surface of the housing. This further rotation also allows the waste to become more deeply situated within the flexible waste receptacle. As the rotation of the housing nears a complete revolution, the litter from the litter storage space spills out of the litter storage space, down the sifting member, and through the openings in the first portion of the sifting member, providing further aeration of the litter. As a result, the waste is extricated and stored in the flexible waste receptacle and, when the housing is returned to its initial resting orientation, the bottom interior surface of the housing is furnished with sifted litter that has been aerated and may be reused.

In the preferred embodiments, as the apparatus is returned to its initial resting orientation, the filled flexible waste receptacle is self-closing. The weight of the collected waste, along with any residual accompanying litter, causes the flexible waste receptacle to drape over an edge of the waste collection port. Closure may also be achieved when the flexible waste receptacle drapes over an edge of a receptacle closing member. The closure of the flexible waste receptacle limits the escape of unpleasant odors into the ambient air. The quality of the closure is dependant on the weight of the waste material and any residual litter collected in the flexible waste receptacle.

BRIEF DESCRIPTION OF THE DRAWING

The structure and operation of the preferred embodiments to the invention will now be described after first briefly describing the drawings.

DESCRIPTION OF THE PREFERRED EMBODIMENTS

Figure 1:
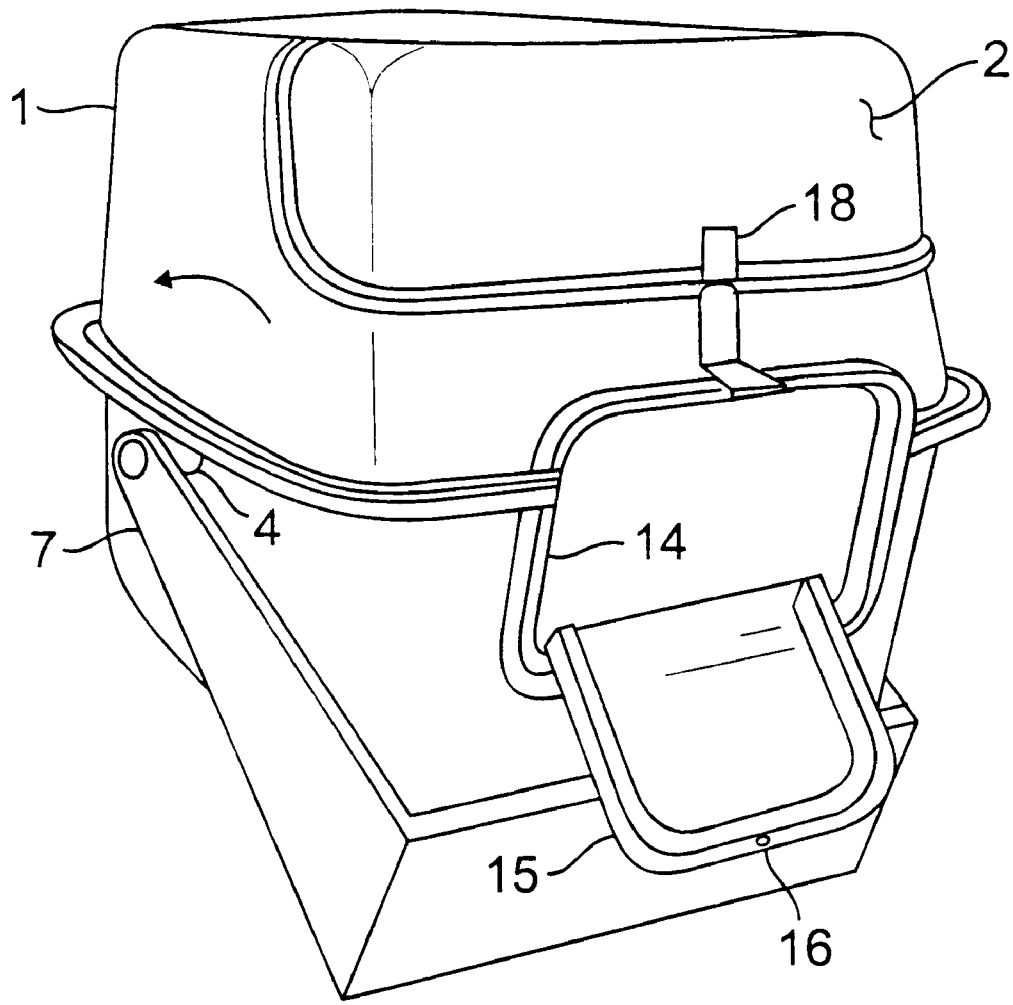
FIG. 1 is a perspective view of a mechanical litter-sifting apparatus according to the invention.
Figure 2:
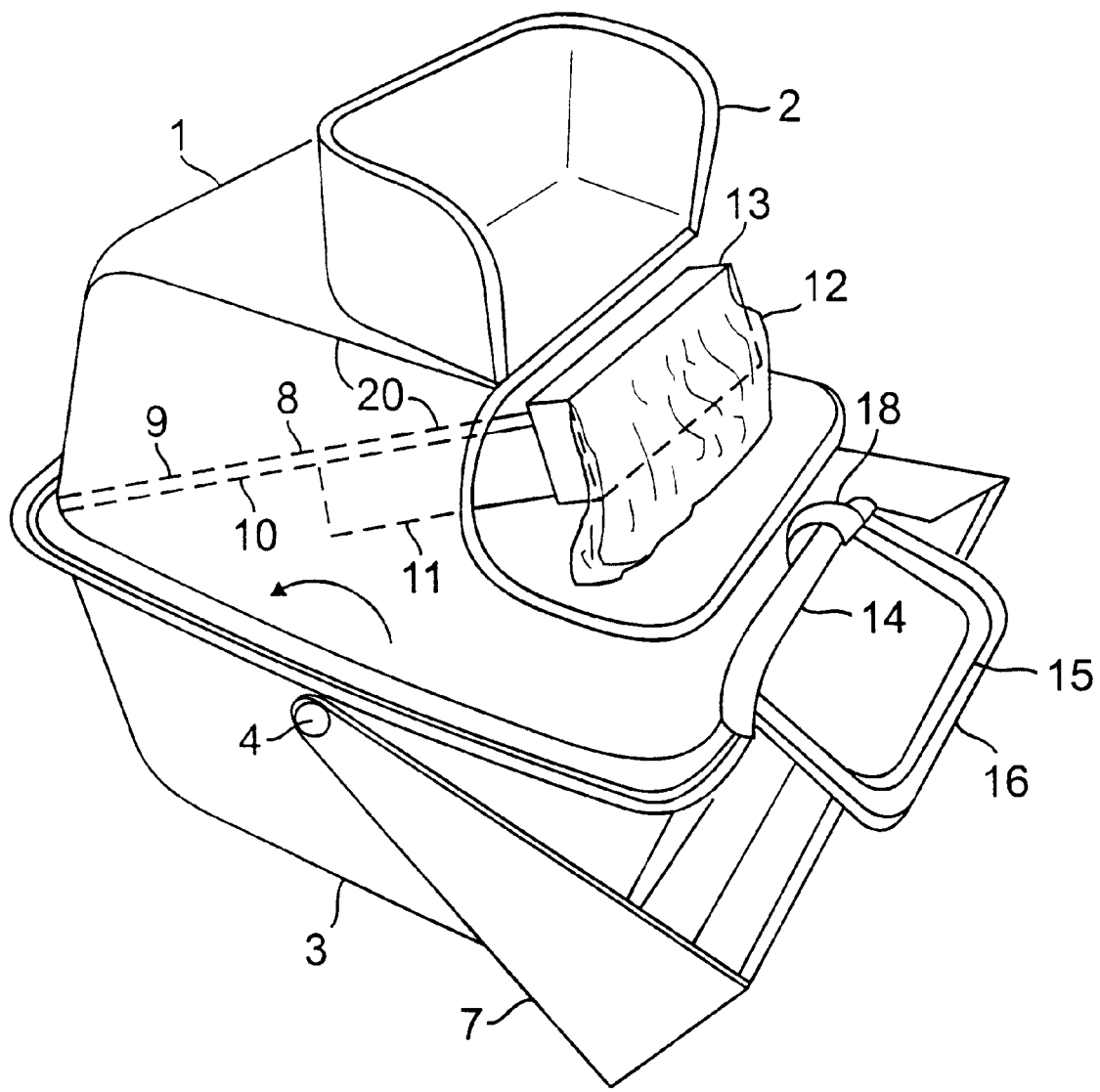
FIG. 2 is another perspective view of the FIG. 1 device further revealing the configuration of certain parts.
Figure 3:
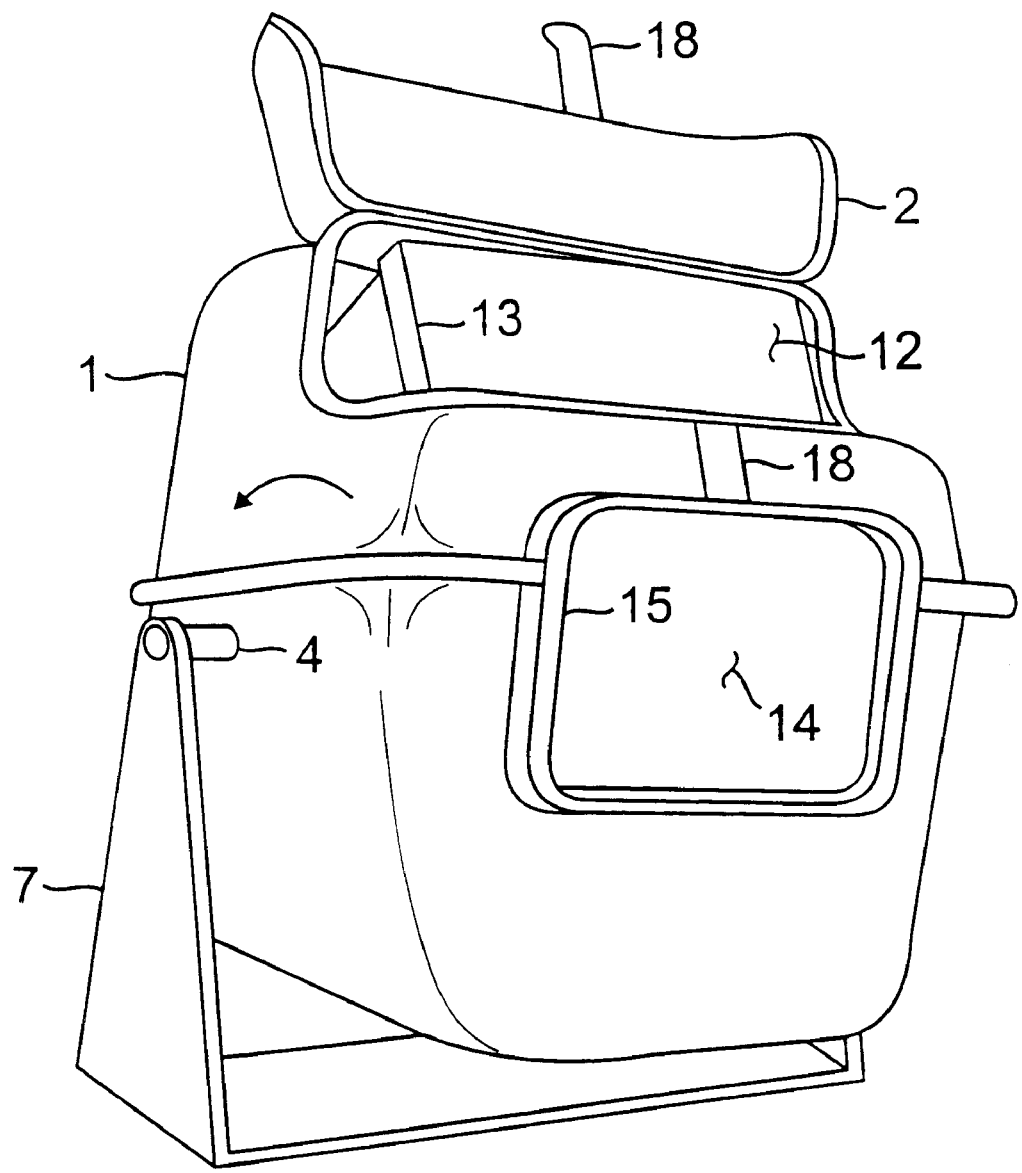
FIG. 3 is another perspective view of the FIG. 1 device.
Figure 4A:
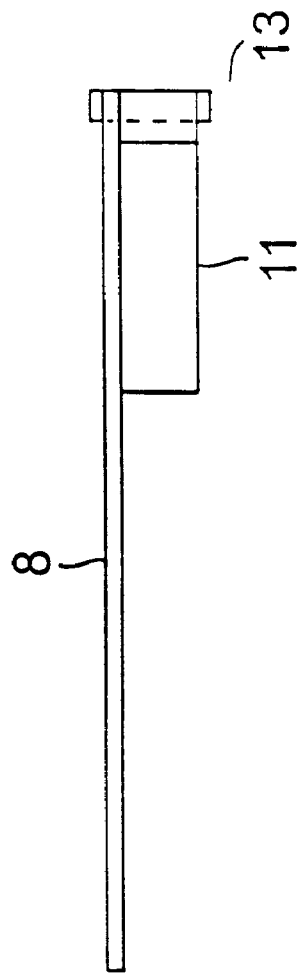
FIGS. 4A and 4B are side and plan views of the sifting member.
Figure 4B:
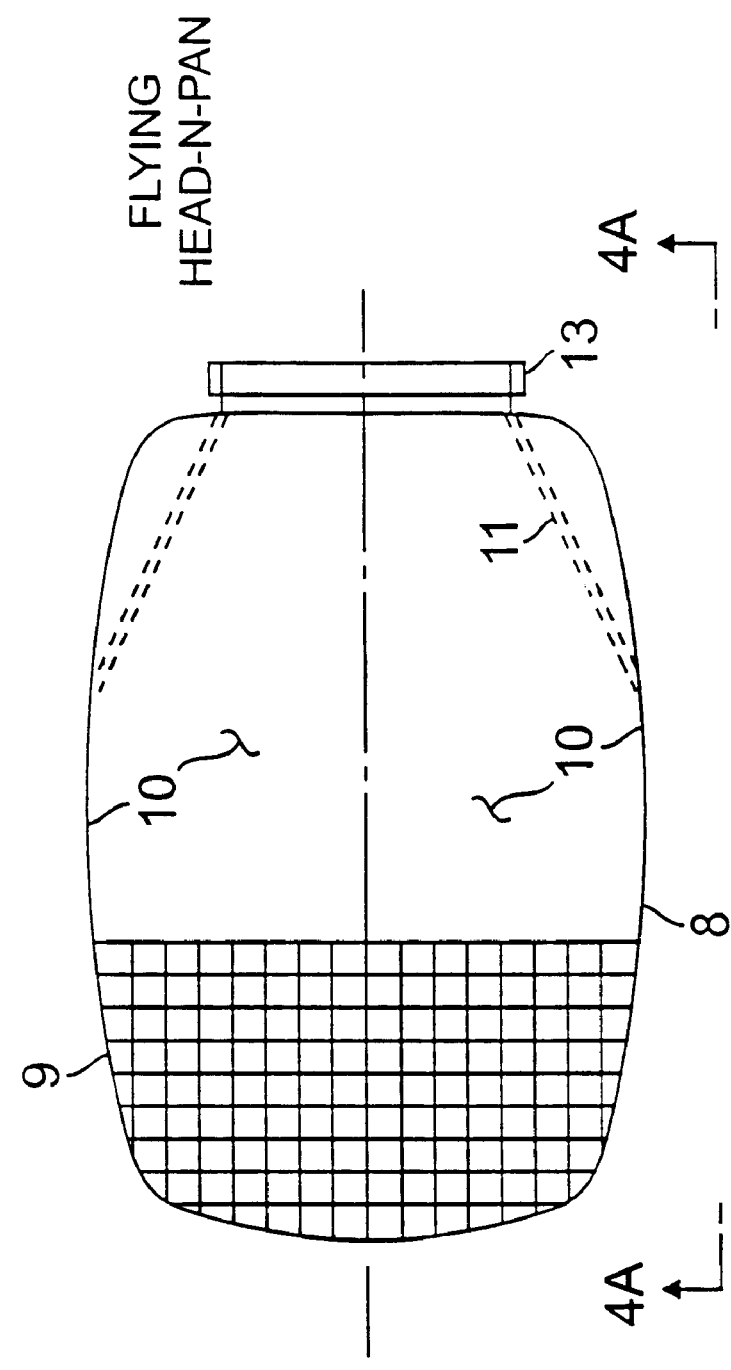

Referring to FIGS. 1–3, 4A, 4B and 5A–5C, there is shown an apparatus employing housing 1 having housing base 3, main opening 14 and closeable door 15 with detent 16. Housing 1 may have shapes other than those disclosed in the figures. Waste access door 2 is mounted on hinge 21. Fastening device 18 preferably employs hook-and-loop fasteners to hold waste access door 2 closed. Door 2 may also be held closed with a detent closure. On opposing sides of housing 1 are stub shafts 4 that permit housing 1 to be elevated and rotated on rocker arm stand 7. Intersecting the interior of housing 1 is sifting member 8 with a first portion 9 having openings to permit the passage of litter, but not pieces of animal solid waste or litter clump waste, and a second portion 10 which does not permit the passage of litter (see FIGS. 4A and 4B). Two guiding panels 11 are connected to second portion 10 of sifting member 8. Sifting member 8 is spaced within housing 1 so as to provide a sufficient volume within housing 1 to accommodate the animal intended to use the apparatus. Preferably, in the initial resting orientation of the apparatus, the entire interior bottom surface of housing 1 is covered with litter (see FIG. 5A) because no structure intrudes on this area. Waste collection port 13 is connected to second portion 10 of sifting member 8. Flexible waste receptacle 12 (e.g., a plastic bag) is attached to waste collection port 13. The second portion 10 of sifting member 8 and part of the interior surface of housing 1 partly bound litter storage space 20.

Referring to FIGS. 6A–6F, there is shown another embodiment of the apparatus that is capable of rolling on the exterior surface of housing 1, rather than rotating about an axis defined by stub shafts 4 when they are situated on rocker arm stand 7. This embodiment includes barrier 22 that retains flexible waste receptacle 12. In this embodiment, waste collection port 13 is connected to barrier 22 and to second portion 10 of sifting member 8. This embodiment also includes support member 23. In other respects, this embodiment has a similar structure to that shown in FIGS. 1–3 and 5A–5F.

Figure 7A:
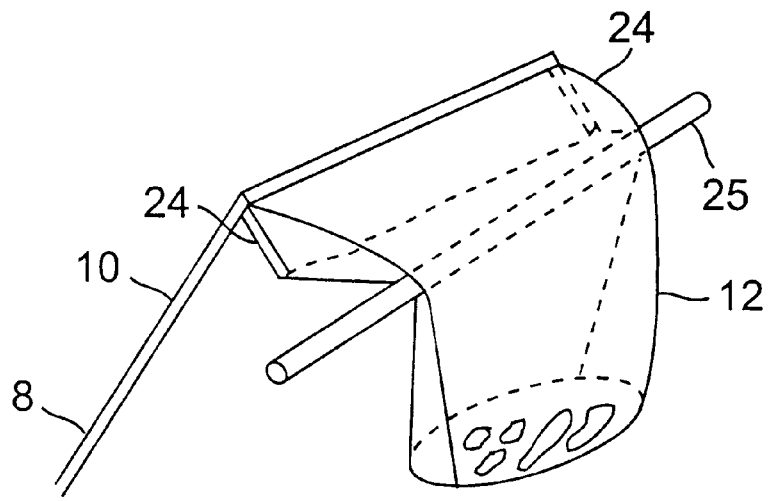
FIGS. 7A and 7B are perspective and side views of part of the embodiment showing an alternate technique for achieving closure of the flexible waste receptacle.
Figure 7B:
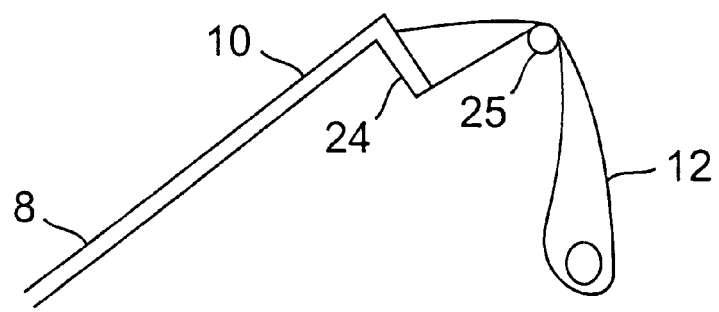

Referring to FIGS. 7A and 7B, there is shown a portion of another embodiment of the apparatus. Flexible waste receptacle 12 is attached to second portion 10 of sifting member 8 and is held open by receptacle mounting posts 24. Flexible waste receptacle 12 is draped over receptacle closing means 25.

Figure 5A:
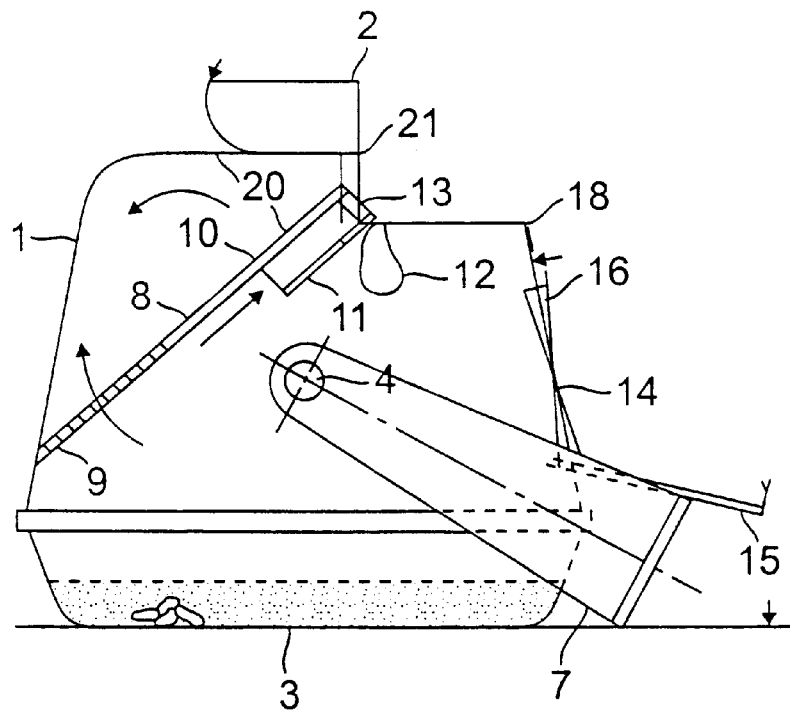
FIGS. 5A–5F are vertical sectional views showing the operation of the embodiment of the invention shown in FIGS. 1–3.
Figure 5B:
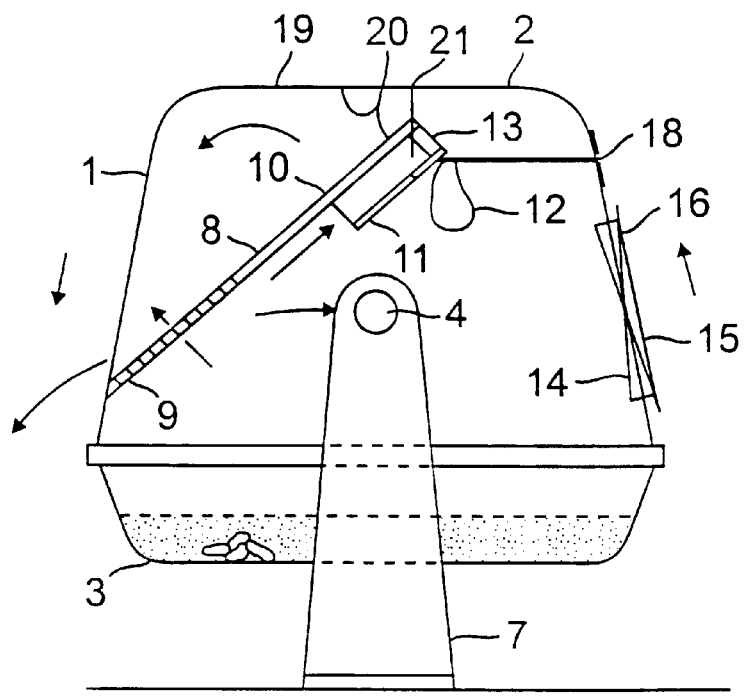
Figure 5C:
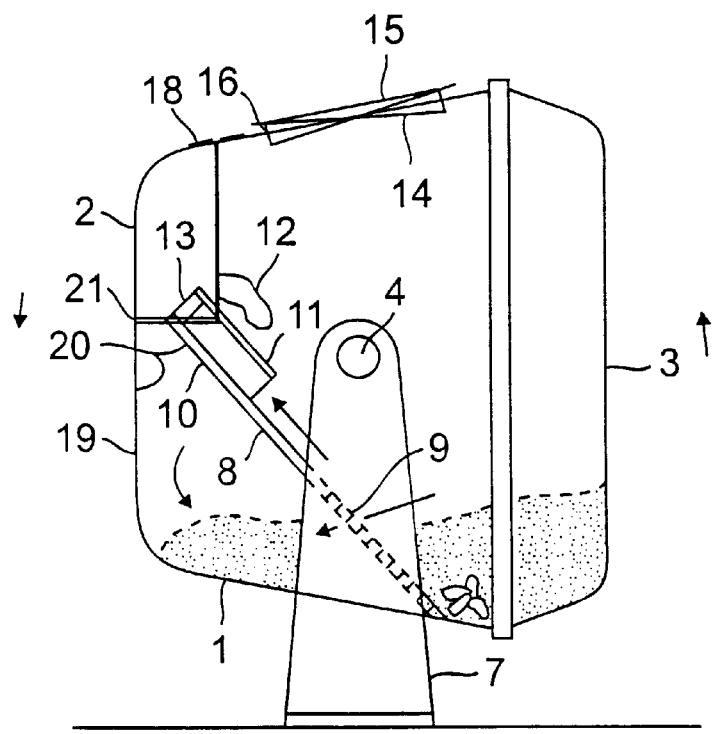
Figure 5D:
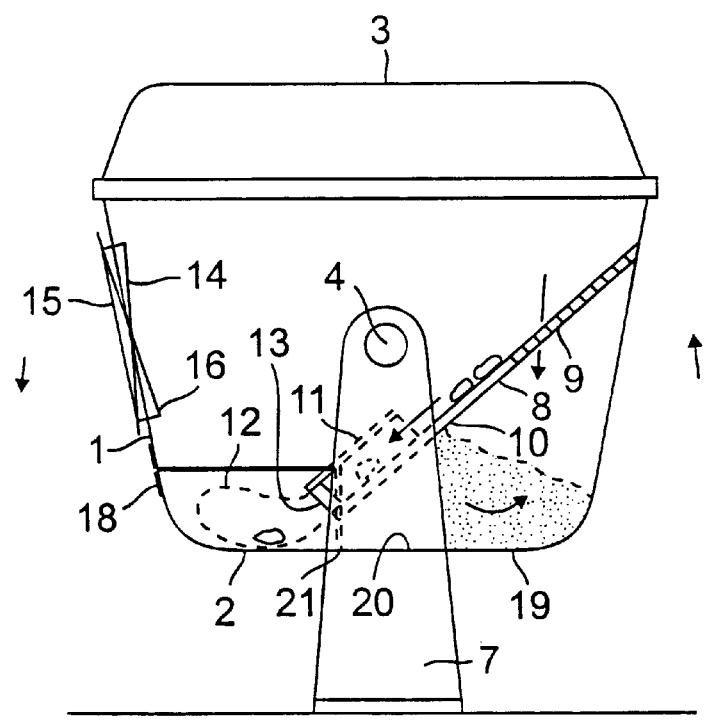
Figure 5E:
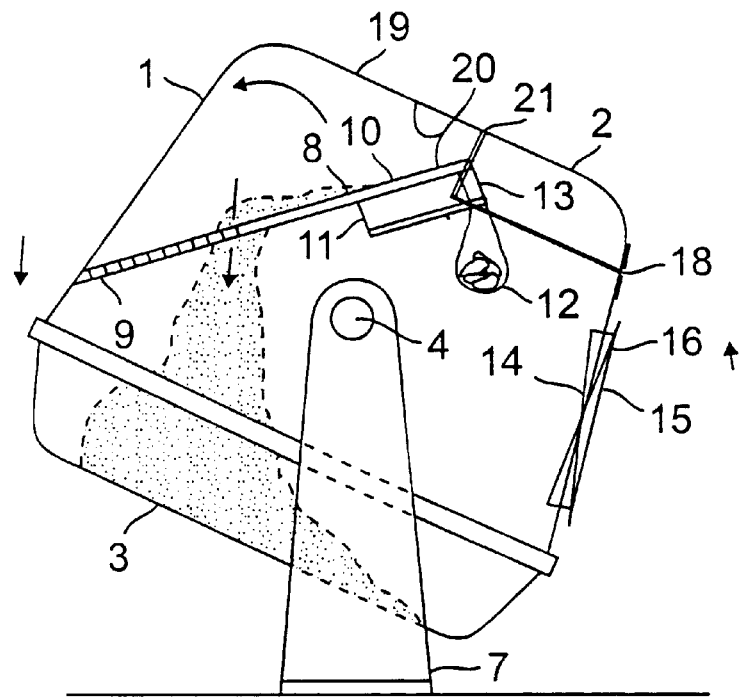
Figure 5F:
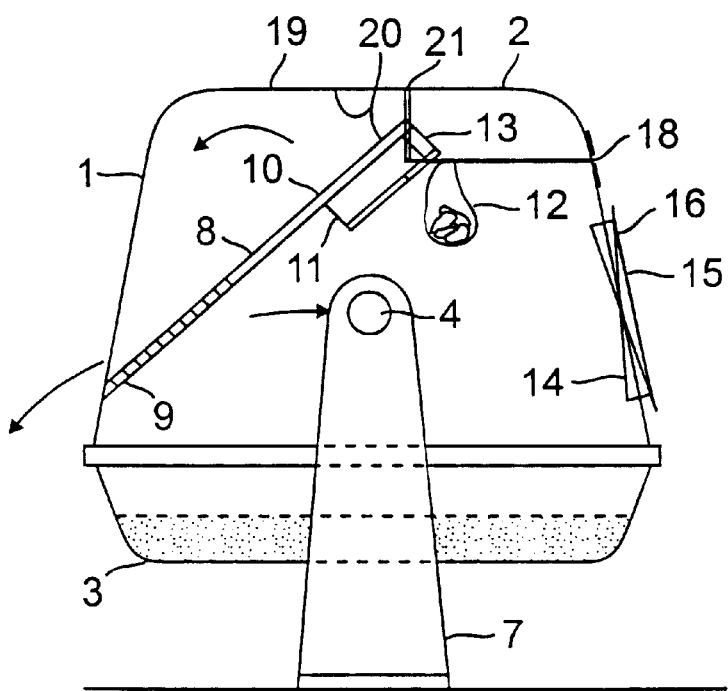

The phases of operation of the FIGS. 1–4, 5A–5F apparatus are shown in FIGS. 5A–5F. When situated in its initial resting orientation for animal access, as seen in FIG. 5A, housing 1 rests on base 3. Door 15 may be situated so as to form a ramp for easier animal access. When used as a ramp, door 15 may be given a traction promoting surface, such as treads or a frictional material. Rocker arm stand 7 in its forward position supports door 15 and maintains it at a suitable angle as a ramp. Fastening device 18 is released and waste access door 2 is opened on hinge 21 in order to remove and empty or replace flexible waste receptacle 12. FIG. 5B shows rocker arm stand 7 in position to allow housing 1 to rotate 360° about an axis formed by stub shafts 4. Door 15 is now closed. Detent 16 on the door is press-fitted into main opening 14 to maintain a tight closure. As housing 1 rotates counterclockwise, as seen in FIG. 5C, litter and waste are sifted by first portion 9 of sifting member 8. Solid waste and litter clump waste are unable to pass through openings in first portion 9. The waste is lifted on the surface of first portion 9 as housing 1 continues its rotation, as seen in FIG. 5D. Through further rotation, sifted litter is retained within litter storage space 20 that is bounded in part by section 19 of housing 1 and by second portion 10 of sifting member 8. When the apparatus is rotated in the intended direction, the retention and suspension of sifted litter within litter storage space 20 prevents sifted litter from resting on door 15, where it could spill out of opening main opening 14. As sifting member 8 becomes more steeply inclined, sifted waste is propelled by gravity from first portion 9 to second portion 10 of sifting member 8, where panels 11 guide the passage of waste through waste collection port 13, and into flexible waste receptacle 12. Continued rotation of housing 1, seen in FIG. 5E, permits sifted litter to shift out of litter storage space 20, down sifting member 8, and through openings in first portion 9. At this point, flexible waste receptacle 12 can drape over an edge of waste collection port 13, so that flexible waste receptacle 12 closes and thus limits the emanation of odors from collected waste into ambient air. FIG. 5F shows housing 1 at the completion of a full 360° rotation. In this position, rocker arm stand 7 may be returned to its forward position and door 15 may be opened to return to the disposition of the embodiment shown in FIG. 5A. The user can either remove flexible waste receptacle 12 after each cleaning operation, or after several such operations. A new flexible waste receptacle 12 is then mounted on waste collection port 13.

Figure 6A:
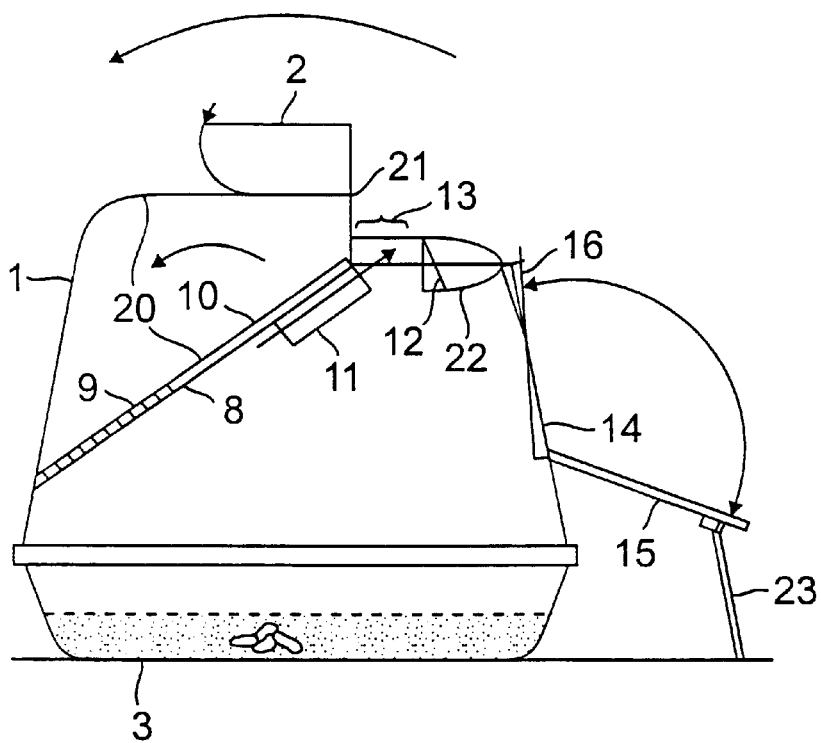
FIGS. 6A–6F are vertical sectional views showing the operation of another embodiment of the invention.
Figure 6B:
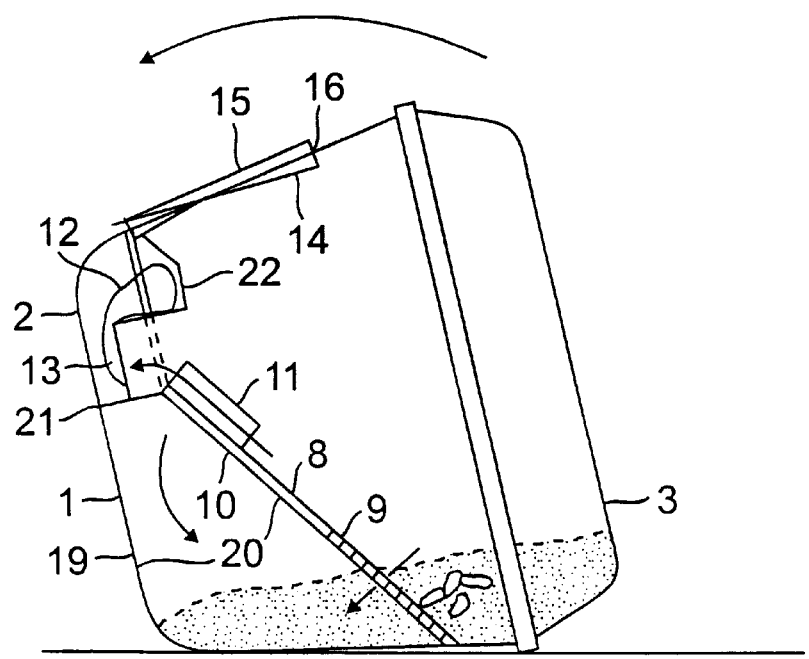
Figure 6C:
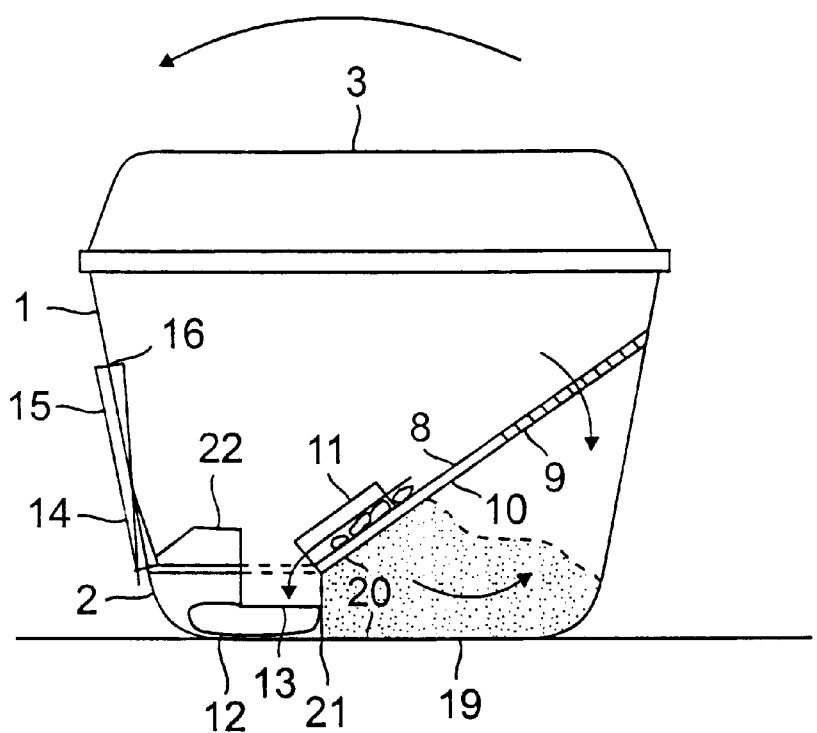
Figure 6D:
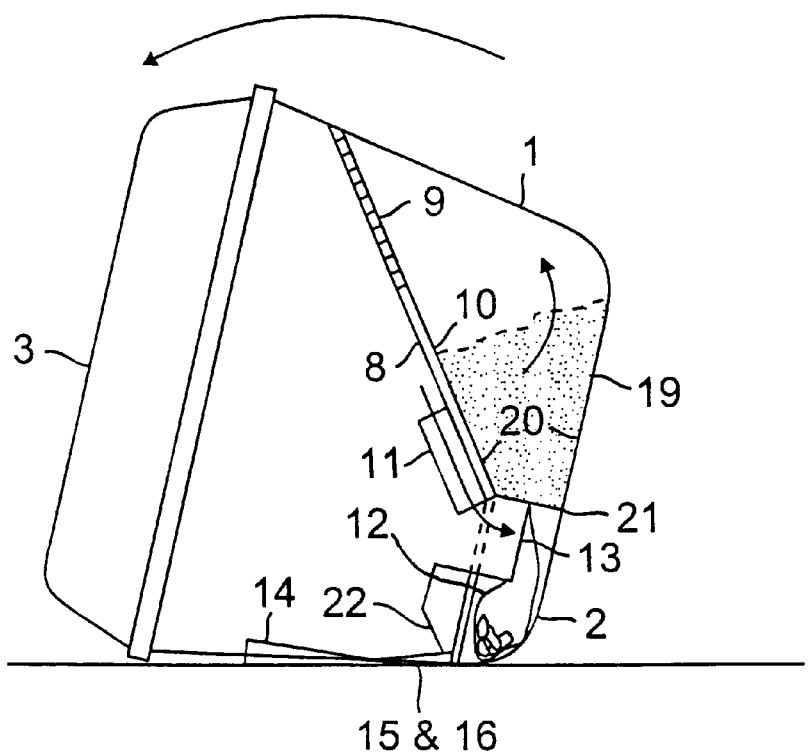
Figure 6E:
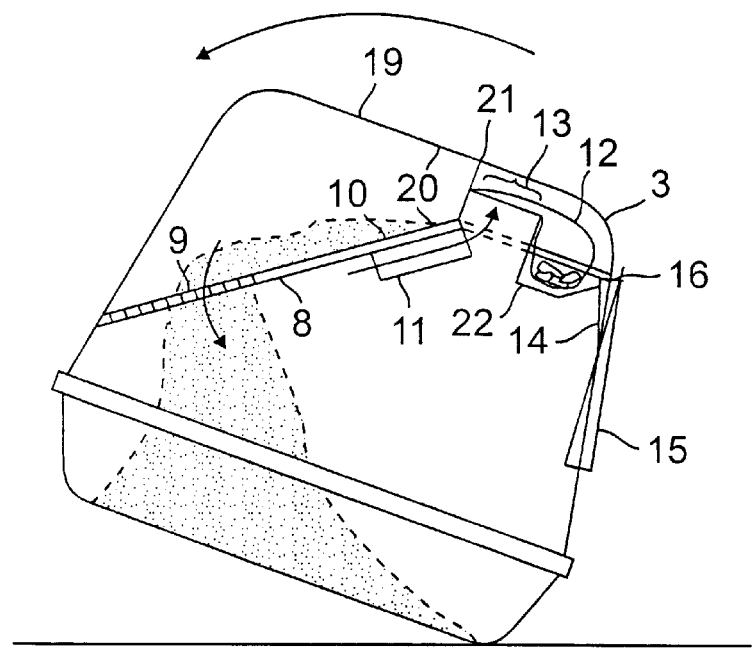
Figure 6F:
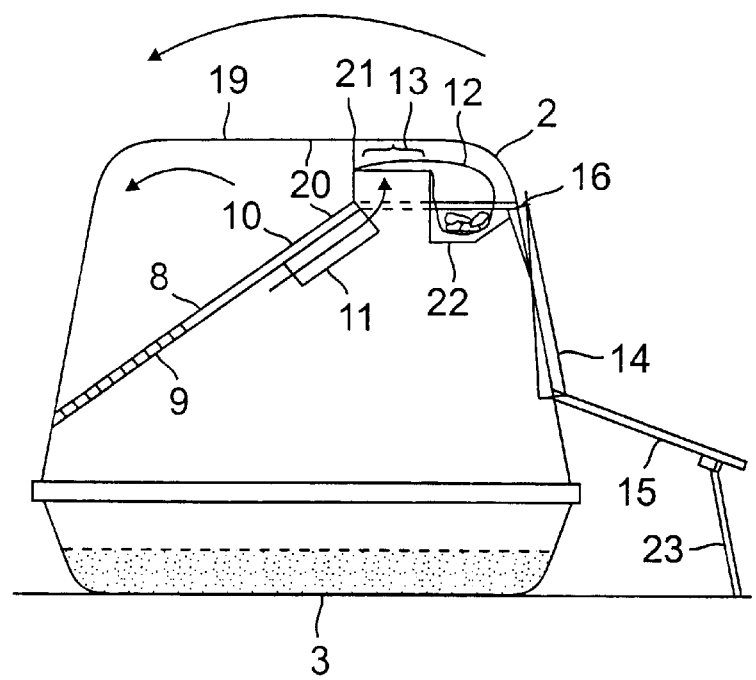

The phases of operation of another embodiment of the invention are shown in FIGS. 6A–6F. In this embodiment, mechanical separation of waste from litter is achieved by rolling housing 1 on its exterior surface, rather than rotating it on rocker arm stand 7, as seen in FIGS. 5A–5F. As seen in FIGS. 6A and 6F, support member 23 is employed to maintain door 15 at a suitable angle for use as a ramp. The operation of this embodiment during rotation, shown in FIGS. 6B–6E, is otherwise analogous to that described for FIGS. 5A–5F. However, in this embodiment, barrier 22 prevents flexible waste receptacle 12 from interfering with the passage of an animal through main opening 14. Additionally, waste collection port 13 is connected to barrier 22, in this embodiment.

An alternate technique for closing flexible waste receptacle 12 is shown in FIGS. 7A and 7B. Receptacle mounting posts 24 hold open flexible waste receptacle 12. Flexible waste receptacle 12 is closed when it drapes over an edge of receptacle closing member 25.

What is claimed is:

1. An apparatus that mechanically separates solid waste and litter clumps from litter comprising:

a housing having a main opening for passage of an animal and being capable of rotation in a complete revolution, a sifting member that intersects said housing and has two portions: a first portion of said sifting member having openings that allow litter to pass through it but which will not permit passage of solid waste and litter clumps; and a second portion of said sifting member that will not permit passage of litter, and a flexible bag removably connected to said second portion of said sifting member, said bag being positioned to receive waste passing over said second portion of said sifting member, said flexible bag receiving waste when said sifting member achieves, during the rotation of said housing, an inclined orientation so that solid waste and litter clumps, pass over said second portion of said sifting member and into said flexible bag.

2. The apparatus of claim 1 wherein said housing is rotated in a complete revolution by rolling said housing on its exterior surface.

3. The apparatus of claim 1 wherein said housing has an initial resting orientation when it is not being rotated in order to mechanically remove solid waste and litter clumps from litter.

4. The apparatus of claim 3 wherein, when in said initial resting orientation, said sifting member is situated within and attached to said housing in such a disposition that said first portion of said sifting member is below said second portion of said sifting member.

5. The apparatus of claim 3 wherein the entire interior bottom surface of said housing when in said initial resting orientation may be covered with litter.

6. The apparatus of claim 1 wherein said sifting member is spaced within said housing so as to permit a sufficient volume, within the interior of said housing, to accommodate the animal intended to use the apparatus.

7. The apparatus of claim 1, further comprising a waste collection port to which said flexible waste receptacle is attached.

8. The apparatus of claim 7 wherein said waste collection port is adjacent to said second portion of said sifting member.

9. The apparatus of claim 1, further comprising one or more receptacle mounting posts connected to said second portion of said sifting member, said receptacle mounting posts being capable of positioning said flexible waste receptacle to receive waste.

10. The apparatus of claim 1, further comprising a rocker arm stand rotatably connected to opposing positions on the exterior of said housing so as to permit rotation about an axis.

11. The apparatus of claim 1 wherein said second portion of said sifting member, along with an opposing section of said housing, define a litter storage space that suspends litter during rotation of said housing.

12. An apparatus that mechanically separates solid waste and litter clumps from litter comprising:

a housing having a main opening for passage of an animal and being capable of rotation in a complete revolution, a sifting member that intersects said housing and has two portions: a first portion of said sifting member having openings that allow litter to pass through it but which will not permit passage of solid waste and litter clumps; and a second portion of said sifting member that will not permit passage of litter, a flexible waste receptacle located within said housing and positioned to receive waste passing over said second portion of said sifting member, said flexible waste receptacle receiving waste when said sifting member achieves, during the rotation of said housing, an inclined orientation so that solid waste and litter clumps, pass over said second portion of said sifting member and into said flexible waste receptacle, and a waste collection port to which said flexible waste receptacle is attached, said waste collection port having an elongated side, said flexible waste receptacle being capable of draping over an edge of said elongated side of said waste collection port, so that said flexible waste receptacle closes itself during rotation of said housing and is closed after a complete revolution.

13. An apparatus that mechanically separates solid waste and litter clumps from litter comprising:

a housing having a main opening for passage of an animal and being capable of rotation in a complete revolution, a sifting member that intersects said housing and has two portions: a first portion of said sifting member having openings that allow litter to pass through it but which will not permit passage of solid waste and litter clumps; and a second portion of said sifting member that will not permit passage of litter, a flexible waste receptacle located within said housing and positioned to receive waste passing over said second portion of said sifting member, said flexible waste receptacle receiving waste when said sifting member achieves, during the rotation of said housing, an inclined orientation so that solid waste and litter clumps, pass over said second portion of said sifting member and into said flexible waste receptacle, one or more receptacle mounting posts connected to said second portion of said sifting member, said receptacle mounting posts being capable of positioning said flexible waste receptacle to receive waste, and a receptacle closing member having an elongated edge, said flexible waste receptacle being capable of draping over said elongated edge of said receptacle closing means, so that said flexible waste receptacle closes itself during rotation of said housing and is closed after a complete revolution.

14. An apparatus that mechanically separates solid waste and litter clumps from litter comprising:

a housing having a main opening for passage of an animal and being capable of rotation in a complete revolution, a sifting member that intersects said housing and has two portions: a first portion of said sifting member having openings that allow litter to pass through it but which will not permit passage of solid waste and litter clumps; and a second portion of said sifting member that will not permit passage of litter, a flexible waste receptacle located within said housing and positioned to receive waste passing over said second portion of said sifting member, said flexible waste receptacle receiving waste when said sifting member achieves, during the rotation of said housing, an inclined orientation so that solid waste and litter clumps, pass over said second portion of said sifting member and into said flexible waste receptacle, and a waste access door in said housing to provide access to said flexible waste receptacle.

15. An apparatus that mechanically separates solid waste and litter clumps from litter comprising:

a housing having a main opening for passage of an animal and being capable of rotation in a complete revolution, a sifting member that intersects said housing and has two portions: a first portion of said sifting member having openings that allow litter to pass through it but which will not permit passage of solid waste and litter clumps; and a second portion of said sifting member that will not permit passage of litter, a flexible waste receptacle located within said housing and positioned to receive waste passing over said second portion of said sifting member, said flexible waste receptacle receiving waste when said sifting member achieves, during the rotation of said housing, an inclined orientation so that solid waste and litter clumps, pass over said second portion of said sifting member and into said flexible waste receptacle, and a barrier near said flexible waste receptacle that protects said flexible waste receptacle from interference by animals passing through said main opening.

16. The apparatus of claim 15, further comprising a waste collection port connected to said barrier.

17. An apparatus that mechanically separates solid waste and litter clumps from litter comprising:

a housing having a main opening for passage of an animal and being capable of rotation in a complete revolution, a sifting member that intersects said housing and has two portions: a first portion of said sifting member having openings that allow litter to pass through it but which will not permit passage of solid waste and litter clumps; and a second portion of said sifting member that will not permit passage of litter, a flexible waste receptacle located within said housing and positioned to receive waste passing over said second portion of said sifting member, said flexible waste receptacle receiving waste when said sifting member achieves, during the rotation of said housing, an inclined orientation so that solid waste and litter clumps, pass over said second portion of said sifting member and into said flexible waste receptacle, a closeable door for said main opening, and a rocker arm stand rotatable connected to opposing positions on the exterior of said housing so as to permit rotation about an axis, said rocker arm stand, in a forward position, facilitating situation of said closeable door as a ramp to be used by an animal passing through said main opening in said housing.

18. An apparatus that mechanically separates solid waste and litter clumps from litter comprising:

a housing having a main opening for passage of an animal and being capable of rotation in a complete revolution, a sifting member that intersects said housing and has two portions: a first portion of said sifting member having openings that allow litter to pass through it but which will not permit passage of solid waste and litter clumps; and a second portion of said sifting member that will not permit passage of litter, a closeable door for said main opening in said housing, and a flexible waste receptacle located within said housing and positioned to receive waste passing over said second portion of said sifting member, said flexible waste receptacle receiving waste when said sifting member achieves, during the rotation of said housing, an inclined orientation so that solid waste and litter clumps, pass over said second portion of said sifting member and into said flexible waste receptacle.

19. The apparatus of claim 18 wherein said closeable door, when open, forms a ramp to be used by an animal passing through said main opening in said housing.

20. The apparatus of claim 19, further comprising a support member to facilitate the situation of said closeable door as a ramp.

21. The apparatus of claim 19, wherein said door has a traction promoting surface for providing added traction on said closeable door that facilitates use of said closeable door as a ramp.

22. An apparatus that mechanically separates solid waste and litter clumps from litter comprising:

a housing having a main opening for passage of an animal and being capable of rotation in a complete revolution, a sifting member that intersects said housing and has two portions: a first portion of said sifting member having openings that allow litter to pass through it but which will not permit passage of solid waste and litter clumps; and a second portion of said sifting member that will not permit passage of litter, a flexible waste receptacle located within said housing and positioned to receive waste passing over said second portion of said sifting member, said flexible waste receptacle receiving waste when said sifting member achieves, during the rotation of said housing, an inclined orientation so that solid waste and litter clumps, pass over said second portion of said sifting member and into said flexible waste receptacle, said flexible waste receptacle being capable of draping over a closure member, so that said flexible waste receptacle closes itself during rotation of said housing and is closed after a complete revolution.

* * * * *